Jan. 3, 1967     E. F. STEINERT     3,296,413

ARC WELDING APPARATUS

Filed Dec. 12, 1963                                    2 Sheets-Sheet 1

WITNESSES:
Bernard R. Gieguay
James F. Young

INVENTOR
Emil F. Steinert

BY
Hymen Diamond
ATTORNEY

Jan. 3, 1967    E. F. STEINERT    3,296,413
ARC WELDING APPARATUS

Filed Dec. 12, 1963    2 Sheets-Sheet 2

United States Patent Office 3,296,413
Patented Jan. 3, 1967

3,296,413
ARC WELDING APPARATUS
Emil F. Steinert, Clarence Township, N.Y., assignor to Westinghouse Electric Corporation, Pittsburgh, Pa., a corporation of Pennsylvania
Filed Dec. 12, 1963, Ser. No. 330,062
5 Claims. (Cl. 219—135)

The invention relates to arc welding and has particular relationship to static direct-current arc-welding apparatus of the three-phase or polyphase type. To the extent that this invention in its broader aspects is applicable to arc-melting, the experssion "arc-welding" includes arc-melting within its scope.

Three-phase, static, direct-current arc-welding apparatus in accordance with the teachings of the prior art includes a three-phase transformer connected to be energized from a commercial three-phase supply. This apparatus also includes a rectifier connected to derive direct-current from the transformer. The rectifier is usually connected to the secondary of the transformer through an iron core reactor. Where the secondary of the transformer is connected in delta the reactance may be connected within the delta. The iron core reactor in this prior art apparatus serves for voltage absorbing purposes, absorbing the excess of the open circuit voltage over the arc voltage during the welding operation.

Welding apparatus of the type just disclosed has been widely used and has given generally satisfactory performance. But difficulty has been encountered in using this apparatus in the welding of such sophisticated materials as Inconel alloy, Monel alloy and stainless steel, nickel, high tensile strength steels and the like. Such materials are presently in extensive use and are usually welded with a non-consumable electrode in a shield of pure inert gas such as helium or argon. Difficulty is also encountered in welding such materials as the high-strength steel, referred to in the art as HY80, of which such parts as submarine hulls are composed. HY80 may be welded by semi-automatic welding with a continuous electrode in a shield of pure inert gas. A typical electrode is disclosed in Patent 2,810,818 to Rothchild.. HY80 may also be welded manually with a high-tensile type low hydrogen electrode, typically AWSE–11018 class. The above alloys including HY80 and others like them will be referred to herein as sophisticated alloys. In the welding of materials of these sophisticated alloys the quality of the welds has been poor and the rejects have been excessive, as high as 80% (by X-ray examination) in high pressure piping for submarines.

It is an object of this invention to overcome the above-described deficiency. It is a specific object of this invention to provide a welding apparatus capable of satisfactorily welding such sophisticated materials as Monel and Inconel alloys, stainless steel, high tensile steels and the like and of producing sound welds with these alloys and of minimizing the rejects.

This invention in its broadest aspects is based on the discovery that the iron core reactance in the prior art apparatus causes the deficiencies which militate against its use in welding the above-described materials and alloys. The welding arc is highly irregular introducing high frequency transients and in some instances operating with repeated and transitory short circuits. Eddy currents are produced in the coil of the reactance in the prior art apparatus. These currents have the effect of delaying the initial response to a transitory change in load condition and of producing an overshoot or surge following any arc disturbance. The irregularity of the arc is accentuated and the incidence of momentary arc outages are high. In addition the saturation of the reactor iron is different for different welding current and this materially changes the reaction of this circuit to the current. Difficulty in maintaining the arc is encountered at very low currents, for example, 30 amperes. In its broad aspects this invention arises from the realization that the deficiencies in the arc-welded joints produced in the above-mentioned materials results from this excessive irregularity of the arc. The extended short circuits and surges produce turbulence which permits reactive gas to penetrate, through the shielding atmosphere in the case of inert-gas-shielded welding and through the shield derived from the coating in manual welding, to the welding material to produce porosity and other defects.

In accordance with this invention the irregularity in the operation of the arc and particularly the delay in response to arc voltage variations and the surges following low voltage incidences are suppressed and, to an extent, entirely eliminated by the provision of substantially non-inductive resistance for voltage drop purposes rather than reactance. In accordance with this invention in its broad aspects then, the arc welding apparatus is provided in which the voltage drop is effected by interposing non-inductive resistance between the welding electrode and the work and the supply.

It has further been discovered that in achieving the objects of this invention the cost of the apparatus may be materially reduced. It has been realized that with the non-inductive resistance for voltage drop purposes the transformer through which the rectifier is supplied may be of the open-delta rather than the closed-delta type and thus the number of windings of the transformer and its cost may be materially reduced. Since the voltage absorbing impedance is in this case non-reactive the power-factor is substantially 100% and a transformer of the open-delta type does not introduce excessive phase displacements as would be the situation in prior art apparatus in which the voltage is absorbed by reactance.

In accordance with this invention in its specific aspects arc-welding apparatus is provided in which the transformer is of the open-delta type and the excess of the open circuit voltage over the arc voltage is absorbed by non-inductive resistors. In the use of this apparatus it has been found that, despite its lower cost, sound arc welded joints may be produced in the fabrication of the above-described alloy materials and the rejects are minimized.

The resistors develop substantial $I^2R$ loss and may rise to a relatively high temperature (375° F. in some cases). The cooling of the resistors is effected by passing the exhaust air which is blown over the transformer and rectifiers over the resistors. This effectively cools the resistors and permits the use of smaller resistors than would otherwise be demanded.

In summary attempts have been made to weld the sophisticated materials generally with welders employing D.C. controlled saturable core reactor where "finger tip" control of welding current at the torch is required. This permits the operator to adjust the current while welding and also to taper off the current at the end of the weld to prevent crater in weld metal deposited.

The more conventional type welders, as for example the movable core type, give better welding arc characteristics than those employing saturable core reactor but they lack a fast responding means for "finger tip" control or programming of amperage.

It has been found that the resistance controlled welder gives superior welding arc characteristics and overcomes the serious deficiencies of the above supplies. The difference is largely attributed to the elimination of the effect of the iron in the reactor particularly the saturable reactor.

The effect of the iron under the relatively high frequency transitory irregularities of the welding arc is the result of hysteresis, eddy currents, induction (flux density) and length of air gap.

The use of resistance in place of an iron core reactor eliminates all the deleterious affects of the iron and provides substantially instantaneous response to the rapid load changes of the arc.

There is also a considerable economy in apparatus cost through use of resistor in place of reactor. An important economy is the use of the 2-coil open-delta transformer which is feasible in this case because of the high power factor load on the transformer.

The novel features considered characteristic of this invention are disclosed generally above. For a better understanding of this invention, both as to its organization and as to its method of operation, together with additional objects and advantages thereof, reference is made to the following description taken in connection with the accompanying drawing, in which.

Figure 1:
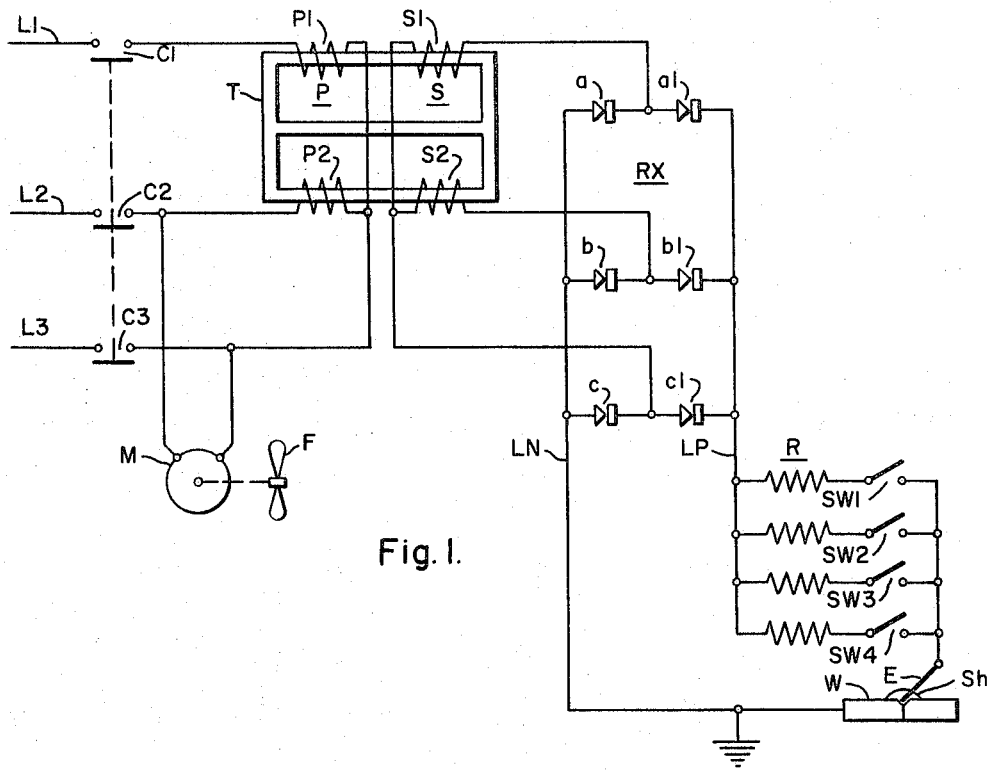
FIGURE 1 is a schematic view showing an embodiment of this invention in its specific aspects.

The apparatus shown in FIG. 1 includes a transformer T having a primary including a pair of primary windings P1 and P2 and a secondary S including a pair of secondary windings S1 and S2. This apparatus is supplied from the buses L1, L2, L3 of a commercial supply through the contacts C1, C2, C3 of a circuit breaker (not shown). A motor M for driving a fan F for cooling is connected between the buses L2 and L3.

The transformer T has relatively low reactance. The only reactance is the leakage between the windings P1, P2, S1, S2 and the transformer may be constructed so that this reactance is relatively small. The primary P is connected in open-delta. P1 and P2 having a common terminal connected to the bus L3 through the contacts C3. P1 and P2 also have seperate terminals each connected to one of the buses L1 and L2 respectively through the contacts C1 and C2. The secondaries are likewise connected in open-delta having a comon terminal and two separate terminals.

The apparatus shown in FIG. 1 also includes a rectifier bridge RX including a plurality of silicon diodes $a$, $a1$, $b$, $b1$, $c$, $c1$. The silicon diodes $a$, $a1$, $b$, $b1$ and $c$, $c1$ are connected in rectifying relationship with the secondary S.

The rectifier RX has a positive output terminal LP and a negative output terminal LN. The output of the rectifier RX is connected to weld work W with an electrode E. The welding may be carried out either at straight or reverse polarity but in FIG. 1 is shown as being carried out at reverse polarity. In this case the electrode E is connected to the positive output terminal LP through a bank of non-inductive resistors R. The resistors of R may be selectively connected in arc-current supply relationship with E and W through selector switches SW1, SW2, SW3 and SW4. The work is connected directly to the negative conductor LN. The connection may be through the usual ground to which the work W and the negative terminal LN are connected.

In the use of the apparatus the selected switches SW1 through SW4 are closed to provide the desired welding current. An arc is then fired between the electrode and the work and power is supplied to the arc to produce the welding from the output conductors LP and LN. On repeated shorting of the arc, the response of the apparatus is instantaneous and the time of shorting is minimal. In addition, following the short, the potential between the terminals LP and LN instantaneously rises to the normal open circuit magnitude and no surge is produced.

This apparatus has been successfully used to weld the alloys such is Inconel alloy and Monel alloy.

Figure 2:
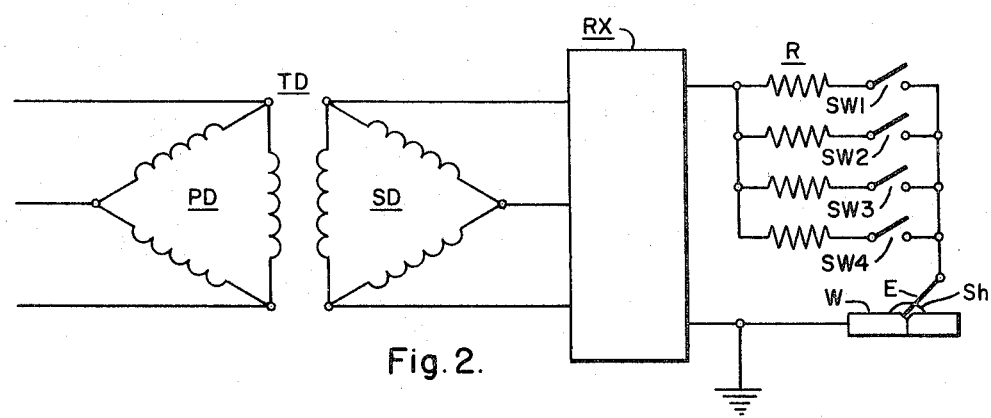
FIG. 2 is a schematic view showing an embodiment of this invention in its broader aspects.

In the apparatus shown in FIG. 2 the transformer TD is of the closed-delta type having primary PD and secondary SD; the apparatus is otherwise similar to that shown in FIG. 1. The apparatus shown in FIG. 1 has the advantage that it is more simple and substantially less costly than the apparatus shown in FIG. 2.

Figure 3:
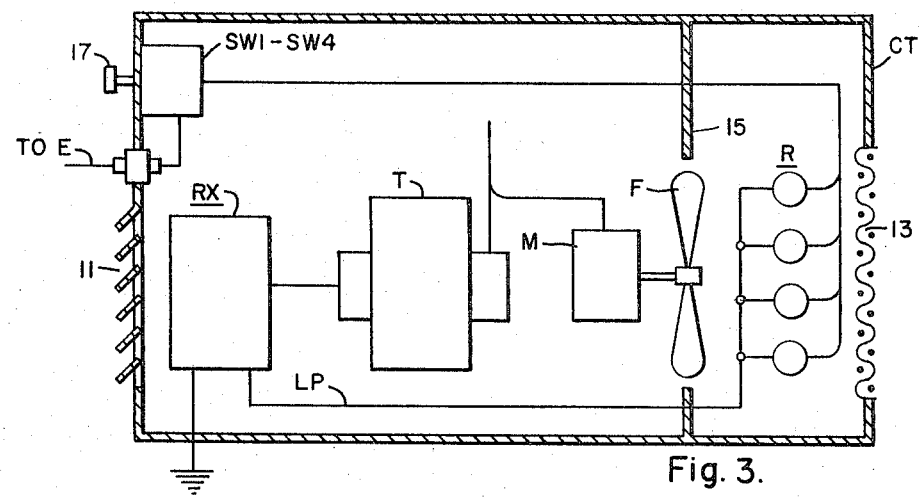
FIG. 3 is a view, partly in transverse section and partly diagrammatic, showing the mechanical structure of the embodiments shown in either FIG. 1 or FIG. 2.

The apparatus shown in FIG. 1 or 2 may be mounted in a closed cabinet or container CT shown in FIG. 3 having louvers 11 in the lower portion of one side and open-work such as a screen 13 in the other side. The cabinet also has a baffle 15 adjacent the screen 13. The resistor bank R is mounted along the screen 13 with the baffle 15 inwardly from the bank R. The motor M and fan F may be mounted adjacent the resistors so as to force a draft of air which flows in through the louvers 11, through the resistors R and out through the screen 13. The resistors are thus effectively cooled with exhaust air which passed over the rectifier and transformer which is only slightly higher in temperature (about 10°) than incoming air.

The cabinet CT has a panel above the louvers 11. The switches SW1 through SW4 are mounted on this panel. Switching mechanisms 17 for the switches SW1 through SW4 and the terminal LP extend through this panel.

Figure 4:
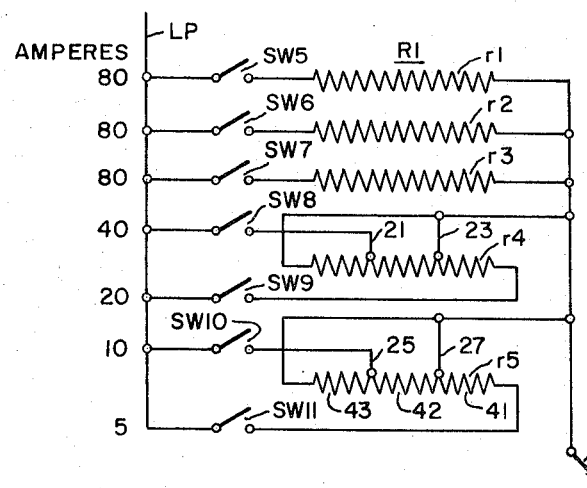
FIG. 4 is a schematic view showing a resistor bank which may be used either in the embodiments shown in FIG. 1 or the embodiment shown in FIG. 2; and, FIG. 5 is a schematic view showing another resistor bank for use in either of the embodiments shown in FIGS. 1 or 2.

FIG. 4 shows a resistor bank R1 which may be used in the practice of this invention. This bank includes a plurality of switches SW5 through SW11 which may be selectively connected to the various resistors of the bank. The welding current in amperes conducted on the closure of each of the switches SW5 through SW11 is indicated to the left of the switches.

The bank R1 includes the resistors $r1$, $r2$ and $r3$ connected as a whole between the electrode E and the fixed poles of the switches SW5, SW6, SW7. In addition, there are tapped resistors $r4$ and $r5$ which are provided with taps 21, 23, 25, 27 dividing the resistors into three equal resistance sections. Tap 21 is connected to the fixed pole of switch SW8 and tap 25 to the pole of SW10. The right-hand terminals of resistors $r4$ and $r5$ are connected to the fixed poles of SW9 and SW11. The movable contacts of the switches are connected to the terminal LP.

With the bank shown in FIG. 4, a wide range of welding currents may be set. For example, on the closure of the switch SW11 only the extreme right-hand section 41 of resistor $r5$ is in the arc circuit. Typically, section 41 may have a resistance of about 7 ohms and the welding current in this case is only 5 amperes. For 10 amperes, switch SW10 may be closed. In this case the extreme left-hand section 43 and the center section 42 of resistor $r5$ are connected in parallel and the current is twice the current achieved with the closure of switch SW11 or 10 amperes. The closure of SW11 and SW10 produces 15 amperes. Switches SW8 and SW9 operate similarly with resistor $r4$ to set the current at 20, 40 or 60 amperes. With SW9 alone closed, the current is 20 amperes; with SW8 alone closed, the current is 40 amperes; with both closed, the current is 60 amperes. Typically the sections of resistor $r4$ may have a resistance of 1¾ ohms. With any one of switches SW5, SW6 or SW7 closed, 80 amperes is conducted. If 240 amperes is desirable, all three switches are closed. With two of the switches closed 160 amperes is conducted.

Figure 5:
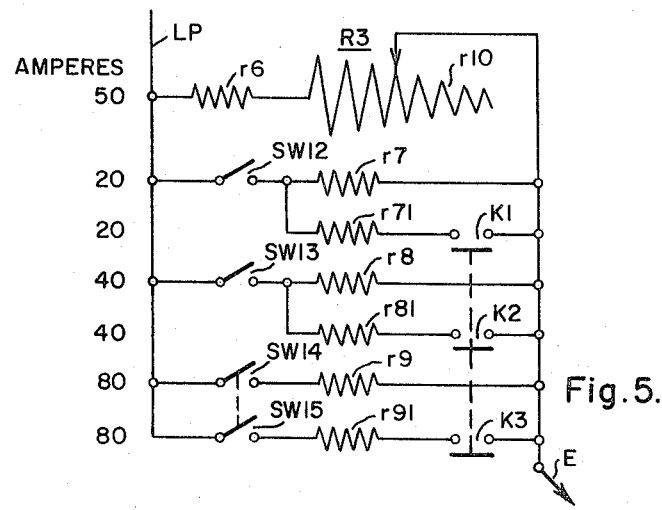

FIG. 5 shows a different bank R3 including a resistor $r6$ and a variable rheostat $r10$ in series between LP and E. The resistance of $r10$ tapers from low resistance per unit length near $r6$ to higher resistance per unit length remote from $r6$. There are also pairs of resistors $r7$, $r71$, $r8$, $r81$ and $r9$, $r91$. In the pairs $r7$ is of equal magnitude to $r71$, $r8$ to $r81$, and $r9$ to $r91$. Resistors $r71$, $r81$, and $r91$ may be connected in parallel with $r7$, $r8$ and $r9$, respectively by actuating contactor K (coil not shown) to close contacts K1, K2, K3. With K actuated $r7$, $r71$, $r8$, $r81$, $r9$, $r91$ are adapted to be connected in the arc circuit by the closing of selector switches or circuit breakers SW12, SW13, SW14, SW15. The current conducted through the resistor $r6$, with $r10$ at zero setting, and through each of the pairs $r7$ through $r91$, when the selector switches SW12, SW13, SW14 and SW15 are respectively closed, is indicated on the resistors.

The resistor $r10$ and the contactor K serve to reduce or taper off or program, the current at the end of a welding interval so as to suppress formation of a crater. During normal welding K is actuated. At the end of the welding interval K is deenergized, the current then drops to the lower magnitude corresponding to the higher resistance in the welding circuit and a presetting of $r10$. For more sophisticated welding the arm of $r10$ may be driven by a variable speed motor (not shown). This motor is set at a speed determined by the conditions of the welding operation. During welding resistor $r10$ is set at zero resistance. Near the end of the welding operation the motor is energized increasing the resistance in series with $r6$ at a predetermined rate. At a selected point along the resistor $r10$, dependent on the selector switches $r12$ through $r15$ which are closed, a limit switch is operated to deenergize contactor K.

In typical use of this apparatus contactor K is actuated at the start of a welding operation to close contacts $k1$, $k2$ and $k3$. The appropriate selector switches SW12 through SW15 are then closed and the welding proceeds. The purpose of the selector switches SW12 through SW15 is to select the normal welding current for the applicator. In the welding of such materials as Monel alloy, Inconel alloy, and stainless steel the welding is carried out with a non-consumable electrode E in a shield $Sh$ of inert gas such as helium or argon. For HY80, a 632 electrode or manual electrode is used. Near the end of the welding operation, $r10$ is increased gradually in resistance and contactor K is deenergized and contacts K1, K2 and K3 are opened. The effect of this is to double the resistance in series with the selected switches SW12 through SW15 and to correspondingly reduce the current. The tapering off of the current suppresses any tendency to produce a crater. The arc between the electrode E and the work W is highly stable because of the stabilizing influence of the resistance in the circuit and the atmosphere of the shielding gas or the gas from the coating is highly effective so that sound welds are produced.

As described above the welding current is tapered by a motor-driven rheostat first, followed by a drop to half value of the pre-selected currents SW12 through SW15. Apparatus could also be provided in which the current drops to half value first and then this is followed by rheostat taper. Also the paralleled resistors could be arranged to drop out in sequence, giving a quasi-taper effect to the half value selection. Other combinations to program current are feasible.

While preferred embodiments of this invention have been disclosed herein many modifications thereof are feasible. This invention then is not to be restricted except insofar as is necessitated by the spirit of the prior art.

I claim as my invention:

1. Arc-welding apparatus for welding work with an electrode with power derived from a three-phase supply including a three-phase transformer connected in an open-delta connection and having a primary and a secondary, means connecting said primary in power-deriving relationship to said supply, a rectifier, means connecting said rectifier in power-rectifying relationship with said secondary, non-inductive resistance means, and means including said resistance means connecting said rectifier in a circuit with said electrode and work to energize a welding arc between said electrode and work with said resistance means absorbing substantially the whole excess of the open-circuit output voltage of said rectifier over the voltage of said arc.

2. Arc-welding apparatus for welding work in a protective atmosphere with an electrode with power derived from a three-phase supply including a three-phase transformer having low leakage reactance, having a primary and a secondary, means connecting said primary in power-deriving relationship to said supply, a rectifier, means connecting said rectifier in power-rectifying relationship with said secondary, non-inductive resistance means, and means including said resistance means connecting said rectifier in a circuit with said electrode and work to energize a welding arc between said electrode and work with said resistance means absorbing substantially the whole excess of the open-circuit output voltage of said rectifier over the voltage of said arc, the potential output of said rectifier being adequate to maintain a highly-stable welding arc.

3. The apparatus of claim 2 characterized by that the rectifier is of the silicon-diode type.

4. The method of arc-welding work of sophisticated alloys with an electrode which comprises impressing a potential sufficient to produce and maintain a highly-stable arc between said electrode and work from a substantially non-reactive supply, firing an arc between said electrode and work, while said arc is burning absorbing the excess of said potential over the arc voltage in non-reactive resistance so that the arc is highly stable, and maintaining a protective atmosphere around said arc.

5. Arc-welding apparatus including a cabinet having walls having inlet and outlet openings for cooling air in said walls, and said apparatus including means for transmitting a current of cooling air through said cabinet from said inlet to said outlet opening, said apparatus also including within said cabinet a low reactance welding transformer, a rectifier for deriving direct-current for welding from said transformer, and voltage absorbing resistors connected in voltage-absorbing relationship to said rectifier and conducting said welding current, said transformer, rectifier and resistors being mounted with the resistors most remote along said current of air from said inlet opening.

References Cited by the Applicant

UNITED STATES PATENTS

| | | | |
|---|---|---|---|
| 930,325 | 8/1909 | Thomas | 321—27 |
| 1,647,928 | 11/1927 | Owen | 219—131 X |
| 1,668,377 | 5/1928 | Owen | 219—131 X |
| 1,684,317 | 9/1928 | Harms | 219—131 |
| 1,769,073 | 7/1930 | Rosskopf | 219—131 X |
| 2,074,276 | 3/1937 | Schmerber | 315—139 |
| 2,077,114 | 5/1937 | Klinkhamer et al. | 219—131 X |
| 2,171,512 | 8/1939 | Crout | 219—131 X |
| 2,640,960 | 6/1953 | Force | 321—57 |
| 2,673,915 | 3/1954 | Steinert et al. | 219—131 |
| 2,837,627 | 6/1958 | Soulary | 219—131 X |
| 2,873,356 | 2/1959 | Carroll et al. | 219—131 |
| 3,180,969 | 4/1965 | Williams | 219—131 X |
| 3,185,918 | 5/1965 | Johnson | 323—94 X |
| 3,238,349 | 3/1966 | Anderson et al. | 219—131 X |

OTHER REFERENCES

"Multiple-Arc Welder Saves Time and Space," Construction Methods and Equipment, April 1961.

Westinghouse leaflet B-7590, Westing-ARC RSM, September 1961.

Westinghouse leaflet B-7585, Westing-ARC Multiple Operator Welding System, July 1961.

JOSEPH V. TRUHE, *Primary Examiner.*